(12) United States Patent
Gatten et al.

(10) Patent No.: US 12,018,945 B2
(45) Date of Patent: Jun. 25, 2024

(54) TRACTOR PARAMETER CALIBRATION

(71) Applicant: Zimeno, Inc., Livermore, CA (US)

(72) Inventors: Benjamin M. Gatten, Dublin, CA (US); Riley C. Woodson, Atherton, CA (US)

(73) Assignee: Zimeno Inc., Livermore, CA (US)

( * ) Notice: Subject to any disclaimer, the term of this patent is extended or adjusted under 35 U.S.C. 154(b) by 196 days.

(21) Appl. No.: 17/489,326

(22) Filed: Sep. 29, 2021

(65) Prior Publication Data
US 2023/0111276 A1   Apr. 13, 2023

(51) Int. Cl.
*G01C 21/12* (2006.01)
*B60W 50/00* (2006.01)

(52) U.S. Cl.
CPC ............ *G01C 21/12* (2013.01); *B60W 50/00* (2013.01); *B60W 2050/0083* (2013.01); *B60W 2300/152* (2013.01); *B60W 2300/17* (2013.01); *B60W 2520/06* (2013.01); *B60W 2520/10* (2013.01); *B60W 2520/12* (2013.01); *B60W 2520/14* (2013.01); *B60W 2520/16* (2013.01); *B60W 2520/18* (2013.01); *B60W 2520/28* (2013.01); *B60W 2556/50* (2020.02)

(58) Field of Classification Search
None
See application file for complete search history.

(56) References Cited

U.S. PATENT DOCUMENTS

| 7,229,139 | B2 | 6/2007 | Lu et al. |
| 8,265,826 | B2 | 9/2012 | Feller et al. |
| 8,275,516 | B2 | 9/2012 | Murphy |
| 8,306,697 | B2 | 11/2012 | Lu et al. |
| 8,639,416 | B2 | 1/2014 | Jones et al. |
| 9,002,565 | B2 | 4/2015 | Jones et al. |
| 9,141,111 | B2 | 9/2015 | Webber et al. |

(Continued)

FOREIGN PATENT DOCUMENTS

| AU | 2016259362 | 8/2021 |
| CN | 105987696 | 10/2016 |

(Continued)

OTHER PUBLICATIONS

International Search Report and Written Opinion for PCT/US2023/080816; mail date Feb. 12, 2024; 12 pages.

*Primary Examiner* — Christian Chace
*Assistant Examiner* — Shayne M. Gilbertson
(74) *Attorney, Agent, or Firm* — Rathe Lindenbaum LLP

(57) ABSTRACT

An example calibration system may include a tractor and a calibration unit. The tractor may include a first sensor and a second sensor. The calibration unit may include a processing unit and a non-transitory computer-readable medium containing instructions to direct the processing unit to: (1) determine a first estimate for a tractor parameter based upon signals received from the first sensor; (2) determine a second estimate for the tractor parameter based upon signals received from the second sensor; (3) determine a third estimate for the tractor parameter based upon a combination of the first estimate and the second estimate; (4) determine a tractor parameter correction based upon the second estimate and the third estimate; and (4) apply the tractor parameter correction to the second sensor to control positioning of the tractor.

10 Claims, 7 Drawing Sheets

(56) References Cited

U.S. PATENT DOCUMENTS

| | | |
|---|---|---|
| 9,389,615 B2 | 7/2016 | Webber et al. |
| 10,168,714 B2 | 1/2019 | Webber et al. |
| 10,241,215 B2 | 3/2019 | Medagoda et al. |
| 2005/0165546 A1* | 7/2005 | Aral ............... G05D 1/0278 701/41 |
| 2011/0054729 A1* | 3/2011 | Whitehead .......... G01S 19/14 701/50 |
| 2017/0146667 A1* | 5/2017 | Medagoda ........... G01C 25/00 |
| 2018/0238710 A1* | 8/2018 | Gregory ............. G01C 25/005 |
| 2018/0373264 A1 | 12/2018 | Madsen et al. |
| 2020/0029490 A1* | 1/2020 | Bertucci ............. G05D 1/0276 |
| 2021/0116914 A1 | 4/2021 | Ren et al. |
| 2021/0170947 A1 | 6/2021 | Yunus et al. |
| 2021/0215483 A1* | 7/2021 | Krone ............... G01C 21/165 |
| 2022/0178726 A1* | 6/2022 | Robinson ............. G01B 7/22 |
| 2022/0283298 A1* | 9/2022 | Di ................... G06V 20/56 |
| 2022/0363280 A1* | 11/2022 | Calderon ............. B60W 50/06 |

FOREIGN PATENT DOCUMENTS

| | | |
|---|---|---|
| CN | 108289408 | 7/2018 |
| CN | 108438048 | 5/2021 |
| EP | 3171134 | 12/2019 |
| KR | 20170037404 | 4/2017 |
| KR | 20180098525 | 9/2018 |
| WO | WO2021073165 | 4/2021 |

\* cited by examiner

TRACTOR PARAMETER CALIBRATION

BACKGROUND

Tractors are frequently used to push and pull attachments and implements when carrying out various tasks. Global positioning systems (GPS), also known as global navigation systems, are sometimes used to determine a geo-referenced location of the tractor (and any attachments or implements) when traversing a field, construction site or other landscape. Inertial measurement units determine accelerations and rotations of tractor. Movement of a tractor is often controlled and determined using a potentiometer to sense steering of the tractor and wheel encoders to detect speed of the tractor.

Figure 1:
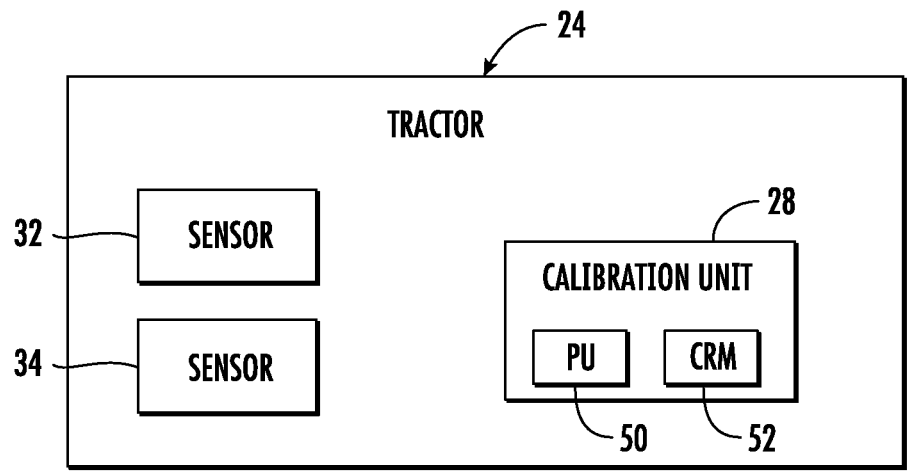
FIG. 1 is a diagram schematically illustrating portions of an example tractor calibration system.

Throughout the drawings, identical reference numbers designate similar, but not necessarily identical, elements. The FIGS. are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION OF EXAMPLES

Disclosed are example tractors, computer-readable mediums and methods that may facilitate more accurate control over movement of a tractor. Over time, the potentiometer and wheel encoders of a tractor may become inaccurate. For example, different inflation levels of the tires of the tractor may lead to inconsistencies in actual distances traveled which may lead to errors in the estimated speed or yaw rate or heading of the tractor.

To reduce such errors, the example tractors, computer readable mediums and methods calibrate a tractor parameter such as the yaw rate of change (e.g. degrees per second or radians per second) (hereinafter, "yaw rate") or speed of the tractor. In the examples illustrated, the example tractors, computer readable mediums and methods calibrate the potentiometer and/or wheel encoder of the tractor by determining and applying a correction or calibration offset to the signals output by the potentiometer and/or wheel encoder. The example tractors, computer readable mediums and methods determine a first estimate for the tractor parameter based upon signals from a first sensor and determine a second estimate for the tractor parameter based upon signals from a second sensor carried by the tractor. The two estimates are then combined or fused to determine a third estimate for the tractor parameter. This third estimate for the tractor parameter is compared to the second estimate to determine a tractor parameter calibration correction or offset for the second sensor. The second sensor by the tractor and is used to control adjustments to the tractor parameter. The determined calibration correction is applied to signals from the second sensor to control subsequent movement and/or positioning of the tractor. For example, steering of the tractor may be subsequently adjusted using any determined yaw rate calibration correction for the potentiometer. Propulsion of the tractor may be subsequently adjusted using any determined speed calibration correction for the wheel encoder.

In some implementations, the third estimate for the tractor parameter may be based upon a combination of the first estimate for the tractor parameter, the second estimate for the tractor parameter, and additional estimates for the tractor parameter. Such different estimates may be combined by fusing the estimates using a Kalman filter, such as an extended Kalman filter. Such additional tractor parameter estimates may be acquired using inertial measurement units.

Disclosed is an example tractor calibration system which may include a tractor and a calibration unit. The tractor may include a first sensor and a second sensor. The calibration unit may include a processing unit and a non-transitory computer-readable medium containing instructions to direct the processing unit to: (1) determine a first estimate for a tractor parameter based upon signals from the first sensor; (2) determine a second estimate for the tractor parameter based upon signals from the second sensor; (3) determine a third estimate for the tractor parameter based upon a combination of the first estimate and the second estimate; (4) determine a tractor parameter correction based upon the second estimate and the third estimate; and (4) apply the tractor parameter correction to the second sensor to control positioning of the tractor.

Disclosed is an example non-transitory computer-readable medium containing instructions to direct a processor. The instructions may comprise first parameter estimation instructions for determining a first estimate of the tractor parameter being calibrated such as the speed or yaw rate of the tractor based upon signals from a first sensor. The instructions may further comprise second tractor parameter estimation instructions determine a second estimate of the tractor parameter being calibrated based upon signals from the second sensor carried by the tractor such as a potentiometer when the tractor parameter being calibrated is steering or yaw rate or such as a wheel encoder when the tractor parameter being calibrated is speed. The instructions may comprise data combination instructions that combine or fuse the first estimate and the second estimate to determine a third estimate for the tractor parameter. The instructions may comprise tractor parameter correction determination instructions which compares the third estimate to the second estimate to determine a correction or calibration value are offset.

The instructions may comprise correction application instructions that apply the determined tractor parameter correction value or offset. In some implementations, the correction value is applied to the signals output by the second sensor such as the potentiometer or the wheel encoder to facilitate more accurate control over the subsequent steering or speed of the tractor. In some implementations, a controller may apply the correction value by adjusting control signals based upon the correction value, wherein the control signals are transmitted to an actuator that adjusts the tractor parameter. For example, the control signals may control an actuator that adjusts the steering angle of front wheels of the tractor, or the torque applied to rear wheels of the tractor to propel the tractor.

Disclosed is an example method for calibrating wheel rotation data and steering data for a vehicle. The method may comprise determining a first estimate for a tractor parameter based upon signals received from a first sensor, determining a second estimate for the tractor parameter based upon signals from a second sensor, determining a third estimate for the tractor parameter based upon a combination of the first estimate and the second estimate, determining a tractor parameter correction based upon the second estimate and the third estimate; and outputting control signals to an actuator control positioning of the tractor based upon the tractor parameter correction.

For purposes of this disclosure, unless explicitly recited to the contrary, the determination of something "based on" or "based upon" certain information or factors means that the determination is made as a result of or using at least such information or factors; it does not necessarily mean that the determination is made solely using such information or factors. For purposes of this disclosure, unless explicitly recited to the contrary, an action or response "based on" or "based upon" certain information or factors means that the action is in response to or as a result of such information or factors; it does not necessarily mean that the action results solely in response to such information or factors.

For purposes of this disclosure, the term "coupled" shall mean the joining of two members directly or indirectly to one another. Such joining may be stationary in nature or movable in nature. Such joining may be achieved with the two members, or the two members and any additional intermediate members being integrally formed as a single unitary body with one another or with the two members or the two members and any additional intermediate member being attached to one another. Such joining may be permanent in nature or alternatively may be removable or releasable in nature. The term "operably coupled" shall mean that two members are directly or indirectly joined such that motion may be transmitted from one member to the other member directly or via intermediate members.

For purposes of this disclosure, the term "processing unit" shall mean a presently developed or future developed computing hardware that executes sequences of instructions contained in a non-transitory memory. Execution of the sequences of instructions causes the processing unit to perform steps such as generating control signals. The instructions may be loaded in a random-access memory (RAM) for execution by the processing unit from a read only memory (ROM), a mass storage device, or some other persistent storage. In other embodiments, hard wired circuitry may be used in place of or in combination with software instructions to implement the functions described. For example, a controller may be embodied as part of one or more application-specific integrated circuits (ASICs). Unless otherwise specifically noted, the controller is not limited to any specific combination of hardware circuitry and software, nor to any particular source for the instructions executed by the processing unit.

FIG. 1 is a schematic diagram illustrating portions of an example tractor calibration system 20. Tractor calibration system determine a first estimate for the tractor parameter based upon signals from a first sensor and determines a second estimate for the tractor parameter based upon signals from a second sensor carried by the tractor. The two estimates are then combined or fused to determine a third estimate for the tractor parameter. This third estimate for the tractor parameter is compared to the second estimate to determine a tractor parameter calibration correction or offset for the non-GPS sensor. This calibration correction is then applied to control subsequent movement and/or positioning of the tractor. Tractor calibration system 20 comprises tractor 24 and calibration unit 28.

Tractor 24 comprises a vehicle configured to carry, push and/or pull attachments and implements when carrying out various tasks. Tractor 24 may be employed in various settings such as an agricultural setting, a residential setting, or in a construction setting. Tractor 24 comprises a first sensor 32 and a second sensor 34.

First sensor 32 comprises a sensor that outputs signals that may be used to estimate the tractor parameter. In some implementations, first sensor 32 is carried by the tractor. In other implementations, first sensor 32 may be remote from the tractor. In some implementations, first sensor 32 may comprise a GPS antenna carried by the tractor. The GPS antenna receives and expands radio signals sent by distinct frequencies from a GPS or GNS system. The signals are converted into electronic signals that are used by an associated GPS receiver to determine the geographic location, such as longitudinal and latitudinal coordinates, of the GPS antenna. Signals output by GPS antenna at different times may be used to estimate a speed of tractor 24. This estimated speed and potentiometer readings indicating steering angle may further be used to estimate yaw rate of tractor 24. In some implementations, tractor 24 may comprise multiple GPS antenna. Signals from multiple spaced GPS antenna on tractor 24 may also be used to estimate the yaw rate of tractor 24.

In some implementations, first sensor 32 may comprise an inertial measurement unit (IMU). An IMU is an electronic device that measures reports a body's force, angular rate of motion and sometimes orientation based upon signals from accelerometers, gyroscopes and/or magnetometers. Signals from an IMU may be used to estimate a yaw rate of tractor 24. Signals from an IMU may be used to estimate a roll and a pitch of tractor 24, wherein the roll and the pitch of tractor 24 may be used to accurately estimate a location and speed of tractor 24 using signals from a GPS antenna. In some implementations, tractor 24 may comprise multiple IMUs, wherein the signals from the multiple IMUs are combined to estimate the roll and pitch of the tractor.

Second sensor 34 comprises a sensor carried by tractor 24 that output signals that are used to determine or estimate a tractor parameter pertaining to movement or positioning of tractor 24. The tractor parameter may serve as a basis for outputting control signals for steering or propulsion of tractor 24 before such steering or propulsion occurs. Second sensor 34 outputs signals that may be used as a basis for determining the tractor parameter independent of any GPS data. Second sensor 34 may be used to directly indicate the tractor parameter by being directly coupled to tires of tractor 24. Due to this direct coupling, control over the angle of the tires (steering our yard) or the torque and rotation applied to such tires (speed) may be controlled based upon signals from the second sensor 34. Examples of the second non-GPS sensor 34 include, but are not limited to, a potentiometer which senses the steering angle of the front tires of tractor 24 and a wheel encoder which senses wheel rotation (revolutions per minute) of the rear tires in a rear drive or front tires and a front drive.

Calibration unit 28 calibrates or corrects settings associated with the second sensor 34 based upon a tractor parameter estimate resulting from a combination of multiple different estimates from different sources or methods. Calibration unit 28 comprises processing unit 50 and non-transitory computer-readable medium 52. Processing unit 50 carries out functions or operations in accordance with instructions provided on computer-readable medium 52.

Figure 2:
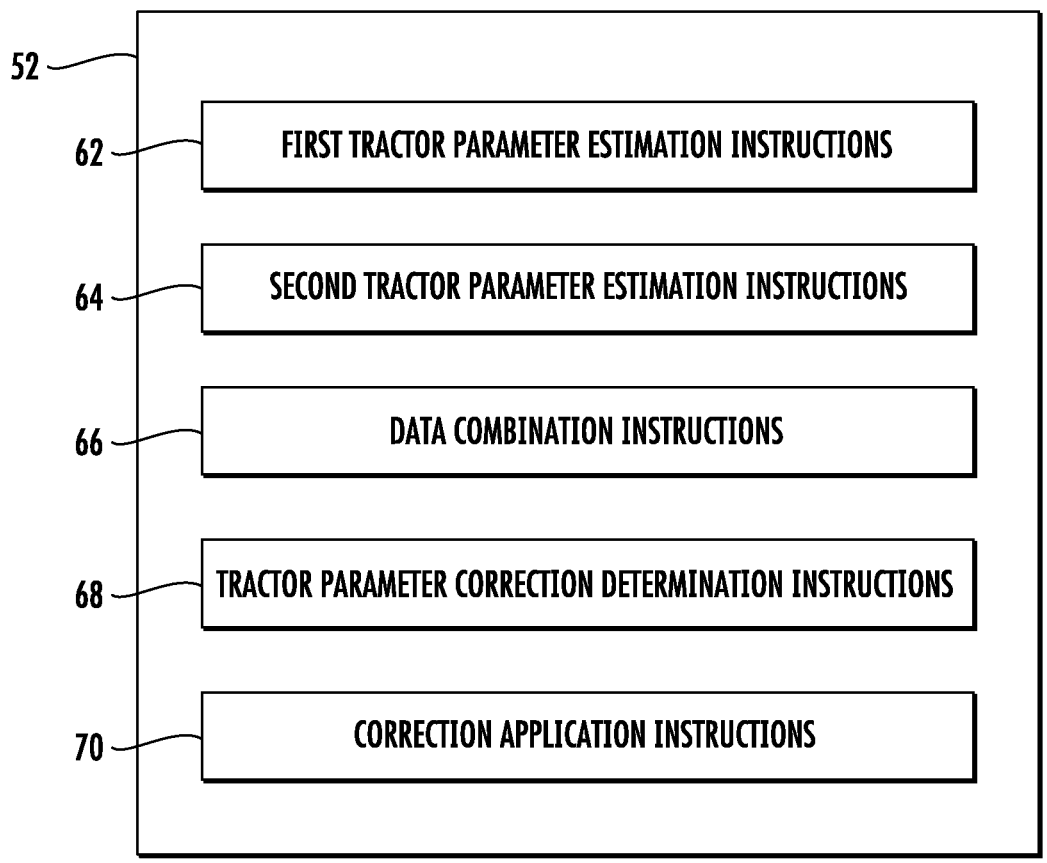
FIG. 2 is a diagram schematically illustrating portions of a non-transitory computer-readable medium containing instructions for the example system of FIG. 1.

Non-transitory computer-readable medium 52 comprise a persistent storage device storing recorded instructions for processing unit 50. Examples of medium 52 include, but are not limited to, solid-state memory (flash memory), disk memory and the like. As shown by FIG. 2, medium 52 comprises first tractor parameter estimation instructions 62, second tractor parameter estimation instructions 64, data combination instructions 66, tractor parameter correction determination instructions 68, and correction application instructions 70. Instructions 60-70 direct processing unit 50 to carry out method 100 outlined in FIG. 3.

Figure 3:
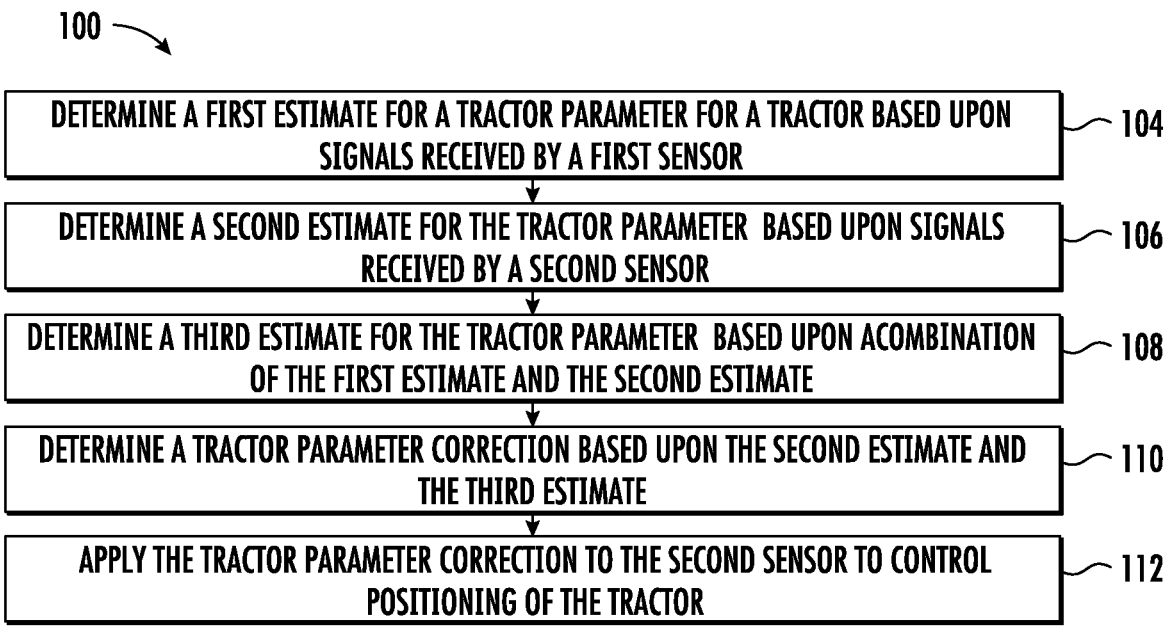
FIG. 3 is a flow diagram of an example method for calibrating a tractor parameter.

As indicated by block 104 of method 100 in FIG. 3, first tractor parameter estimation instructions 62 direct processing unit 50 to determine a first estimate for the tractor parameter being calibrated based upon signals from the first sensor. In some implementations, the geographic location of the GPS antenna is determined using the GPS signals received by GPS antenna. Thereafter, they determined position of the GPS antenna is translated to a base link of the tractor, a location or point on the tractor that serves as an coordinate origin for future location controls. In some implementations, the geographic location of the tractor 24, its baselink, is defined in terms of the geographic location of the center of the rear axle of the tractor.

In instances where the tractor parameter being calibrated is the speed of tractor 24, the first estimate for tractor speed may be based upon a differentiated GPS forward speed. The differentiated GPS forward speed estimate may be determined by determining the location of the GPS antenna at two different times. The distance between the two locations divided by the lapse of time between the two different times results in a first speed estimate.

In some implementations, the first speed estimate is based upon the location of the base link or rear axle center rather than the position of the GPS antenna at the two different times. Each of the different GPS antenna locations at the two different times may first be corrected to reduce or eliminate errors caused by momentary roll and pitch of tractor 24. The roll and pitch correction may be based upon signals from an inertial measurement unit carried by tractor 24. In some implementations, the roll and pitch correction is based upon a combination or fusing of roll and pitch estimates from multiple inertial measurement units carried by the tractor. For example, multiple roll and pitch estimates from multiple IMUs may be fused or combined using a Kalman filter such as an extended Kalman filter.

In instances where the tractor parameter being calibrated is the yaw rate of tractor 24, the first estimate for tractor yaw rate may be based upon signals received an IMU or a combination of signals received from multiple different IMUs. In some implementations, the first estimate for tractor yaw rate may be based upon a line drawn between fore and aft GPS antenna locations.

As indicated by block 106 of method 100 in FIG. 3, second tractor parameter estimation instructions 64 direct processing unit 50 to determine a second estimate for the tractor parameter based upon signals received by the second sensor 34. In instances where the tractor parameter being calibrated is tractor speed, the second estimate may be based upon signals received from a wheel encoder of tractor 24, wherein the wheel encoder is directly coupled to the driving wheels wheel driving axle of tractor 24 and senses rotation of the wheels.

In instances where the tractor parameter being calibrated is tractor yaw rate, the second estimate may be based upon signals received from a potentiometer directly coupled to the steering wheels, the front wheels, tractor 24. The yaw rate estimate may be based upon the potentiometer sensed steering angle of the wheels, the front to rear axle distance of tractor 24, and a forward speed of tractor 24. The forward speed of tractor 24 may be based upon signals from a wheel encoder of tractor 24 or based upon a differentiated GPS forward speed.

The differentiated GPS forward speed estimate may be determined by determining the location of the GPS antenna at two different times. The distance between the two locations divided by the lapse of time between the two different times results in a first speed estimate.

In some implementations, the first speed estimate is based upon the location of the base link or rear axle center rather than the position of the GPS antenna at the two different times. Each of the different GPS antenna locations at the two different times may first be corrected to reduce or eliminate errors caused by momentary roll and pitch of tractor 24. The roll and pitch correction may be based upon signals from an inertial measurement unit carried by tractor 24. In some implementations, the roll and pitch correction is based upon a combination or fusing of roll and pitch estimates from multiple inertial measurement units carried by the tractor. For example, multiple roll and pitch estimates from multiple IMUS may be fused or combined using a Kalman filter such as an extended Kalman filter.

As indicated by block 108 of method 100 in FIG. 3, data combination instructions 66 to determine a third estimate for the tractor parameter being calibrated based upon a combination of the first estimate and the second estimate. The fusing or combination of the first estimate and the second estimate includes or encompasses the fusing of the data values that resulted in the first estimate and the second estimate. In some implementations, the first estimate and the second estimate are fused using a Kalman filter, such as an extended Kalman filter. In other implementations, first estimate and the second estimate (including their source data values) may be combined are fused using other algorithms or techniques.

As indicated by block 110 of method 100 in FIG. 3, tractor parameter correction determination instructions 68 direct processing unit 50 to determine a tractor parameter correction or calibration offset based upon a comparison of the second estimate and the third estimate. For example, in instances where the second estimate and the third estimate differ by an amount, the amount may serve as a calibration or offset amount that will be applied in the future when the second estimate, alone, serves as a basis for controlling the tractor parameter that was calibrated, steering and/or propulsion.

A calibration correction may be an adjustment for wheel rotation (speed) and/or tractor steering. For example, a calibration correction may be an automatic adjustment to an angular steering result based upon signals from a wheel encoder or steering sensor. A calibration correction may be automatic in response to a distance traveled result based upon signals from a wheel encoder or other speed sensor. A calibration correction may be an adjustment to the rate of yaw rate and/or the rate of speed output by a steering sensor or a steering sensor. The yaw rate (turning rate) adjustment or the speed rate adjustment may impact the end result depending upon the duration of such yaw rate or speed rate.

As indicated by block 112 of method 100 in FIG. 3, correction application instructions 70 may direct processing unit 50 to apply the determined tractor parameter correction value or offset. In some implementations, the correction value is applied to the signals output by the second sensor 34 such as the potentiometer or the wheel encoder to facilitate more accurate control over the subsequent steering or speed of the tractor. In some implementations, a controller may apply the correction value by adjusting control signals based upon the correction value, wherein the control signals are transmitted to an actuator that adjusts the tractor parameter. For example, the control signals may control an actuator that adjusts the steering angle of front wheels of the tractor, or the torque applied to rear wheels of the tractor to propel the tractor.

Figure 4:
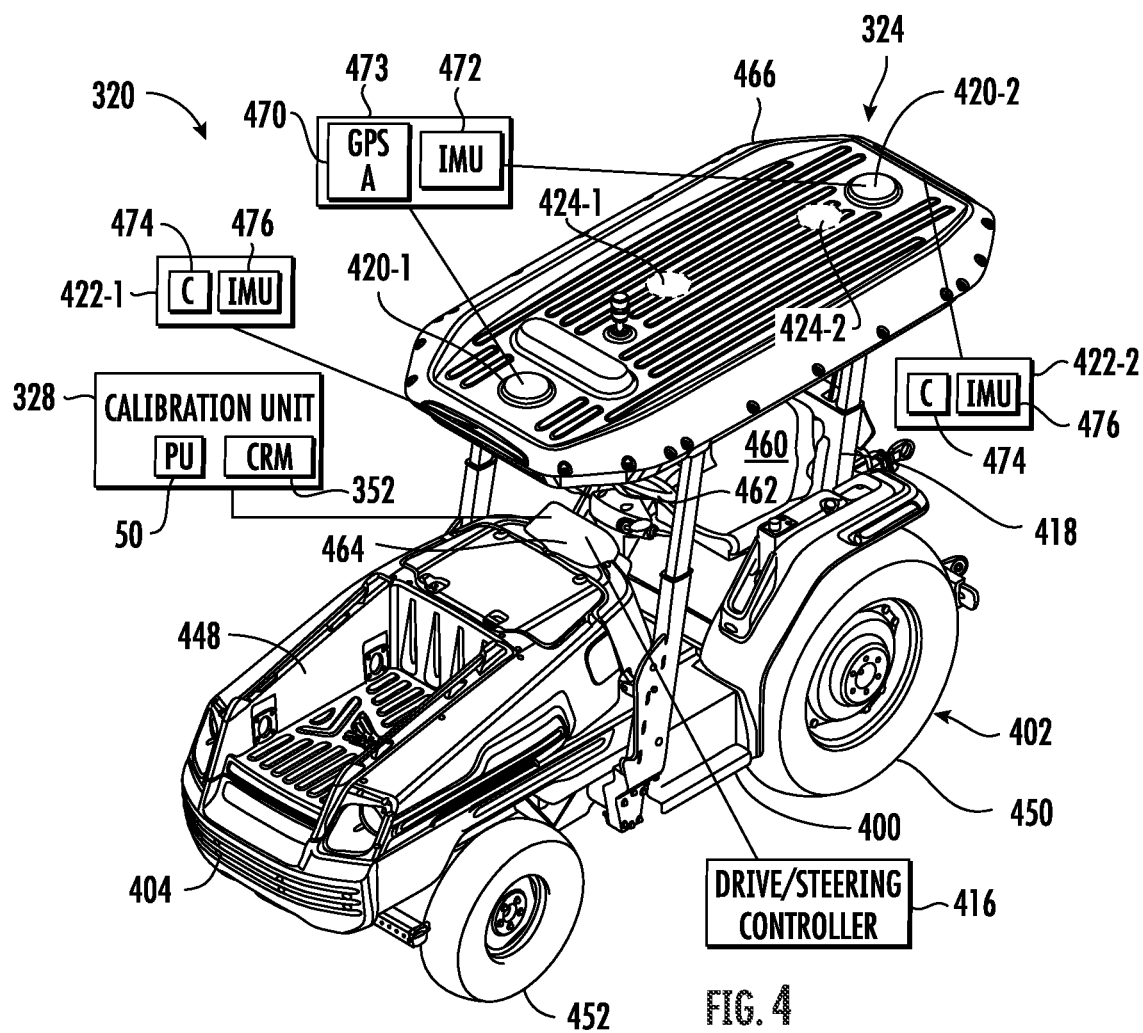
FIG. 4 is a front perspective view of an example tractor calibration system.
Figure 5:
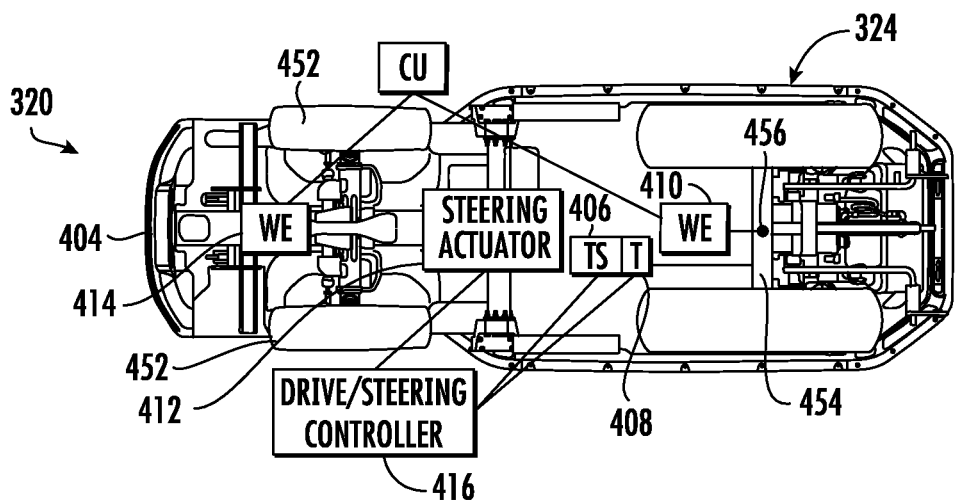
FIG. 5 is a bottom view of the example tractor calibration system of FIG. 4.

FIGS. 4 and 5 illustrate an example tractor calibration system 320. System 320 is similar to system 20 described above in that system 320 determines a calibration correction for a tractor parameter of a tractor using combined tractor parameter estimates. FIGS. 4 and 5 illustrate a specific implementation of system 20, wherein system 320 calibrates both the tractor parameters yaw rate and speed and wherein the corrections are applied to both a potentiometer any wheel encoder of the tractor. System 320 comprises tractor 324 and calibration unit 328.

Tractor 324 comprises a vehicle that may be employed in various settings such as an agricultural setting, a residential setting or a construction setting. Tractor 324 may be used for a variety of purposes in agricultural construction and residential purposes. Tractor 324 may be used to push or pull an implement. Tractor 324 may include attachments, such as a bucket, blade, backhoe, or the like for digging, displacing, and/or carrying various materials such as earthen materials, animal waste and produce. Tractor 324 may include forks or other coupling mechanisms for engaging pallets, bins, boxes, or the like, wherein the tractors carry and/or lift the engaged items.

Tractor 324 comprises chassis 400, ground propulsion members 402, battery 404, torque source 406, transmission 408, wheel encoder 410, steering actuator 412, potentiometer 414, drive/steering controller 416, vehicle cab 418, GPS units 420-1 and 420-1 (collectively referred to as GPS units 420), camera units 422-1, 422-2 (collectively referred to as camera units 420), and IMUs 424-1, 424-2 (collectively referred to as IMUs 424.

Chassis 400 comprises a frame supporting the remaining components of tractor 324. In the example illustrated, chassis 400 comprises a front cargo bed 448 for storing and transporting cargo. In the example illustrated, chassis 400 is further configured for connection to an attachment/implement with a hitch or other mounting structure.rm of an electric motor driven by electrical power supplied by battery 404.

Ground propulsion members 402 comprise members that engage the underlying terrain and which are driven. In the example illustrated, ground propulsion members 402 comprise rear wheels 450 and front wheels 452. In the example illustrated, rear wheels 450 are driven by an electrical drive while front wheels 452 are manipulated or turned by steering actuator. In other implementations, ground propulsion members 402 may comprise tracks or other ground engaging members.

Figure 6:
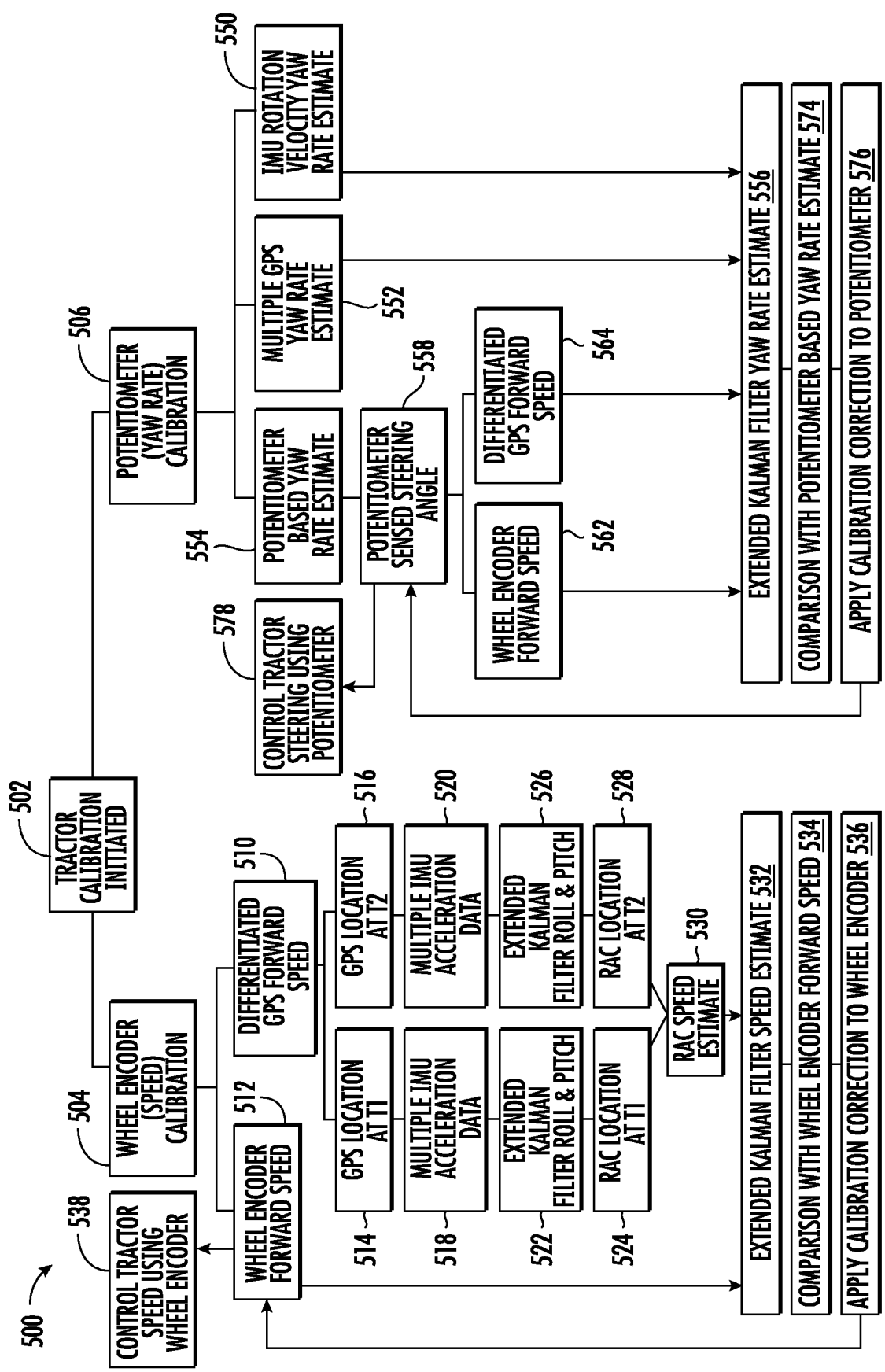
FIG. 6 is a flow diagram of an example tractor parameter calibration method.

As shown by FIG. 6, rear wheels 450 are supported by an/or driven by a rear axle 454 having a rear axle center (RAC) 456. RAC 456 serves as a base link or origin for identifying the geographic positioning or location of tractor 324. The positioning of other components of tractor 324 as well as any attachments or implements being carried, pushed or pulled by tractor 324 may be defined in terms of this base link, the RAC 456 of tractor 324.

Battery 404 comprises a battery unit that is removably received within a corresponding chamber or cavity extending rearwardly from the front of chassis 400. Battery 404 mates with a corresponding connection interface for transferring electrical power from battery 404 to the electrically powered components of tractor 324. In other implementations, battery 404 may be located at other locations. In other implementations, battery 404 may be fixed and non-swappable or not removable. In the example illustrated, battery 404 electrically powers an electric motor or motors that drive rear wheels 450.

Torque source 406 (schematically illustrated) comprises at least one electric motor powered by battery 404. The torque output by torque source 406 is transmitted to rear axle 454 by transmission 408 (schematically illustrated). Transmission 408 conducts torque from torque source 4062 rear axle 454 and in some implementations may provide a plurality of gears or gear ratios delivering various amounts of speed and torque. In some implementations, wheels 450 of tractor 324 may alternatively be driven by an internal combustion engine and associated transmission or by a hybrid system using both a battery and an internal combustion engine.

Wheel encoder 410 senses the rotation (revolutions per minute) of rear axle 454. Wheel encoder 410 is directly connected to or coupled to rear axle 454 go directly sense rotation of rear axle 454 and the rotation of rear wheels 450. As described hereafter, signals from wheel encoder 410 are using the calibration of the tractor parameter speed, wherein the calibration correction is applied to the output of wheel encoder 410 or is used by drive/steering controller 416 to control torque source 406 and/or transmission 408 to achieve a targeted speed for tractor 324.

Steering actuator 412 comprises a device which applies force and motion to adjust the orientation of front wheels 452 to adjust the steering of tractor 324. Steering actuator comprises mechanical, hydraulic or electric actuator (pump etc.) configured to rotate front wheels 452 to effectuate steering of tractor 324. In some implementations, steering actuator 412 may comprise a hydraulic pump and hydraulic cylinder-piston assemblies to adjust the orientation of front wheels 452.

Potentiometer 414 comprises one form of a wheel encoder that detects displacement. In some implementations, potentiometer 414 comprises a rotary potentiometer to measure rotational displacement. Potentiometer 414 detects the adjustment of the orientation of front wheels 452 to indicate a steering angle for tractor 324. As described hereafter, signals from potentiometer 414 are using the calibration of the tractor parameter yaw rate, wherein the calibration correction is applied to the output of potentiometer 414 or is used by drive/steering controller 416 to control steering actuator 412, torque source 406 and/or transmission 408 to achieve a targeted yaw rate for tractor 324.

Drive/steering controller 416 comprises a processing unit and associated non-transitory computer-readable medium containing instructions for directing the processing unit to output control signals for controlling torque source 406, transmission 408 and steering actuator 412. Such control signals may be generated in response to a computer program controlling automatic navigation and automated operations of tractor 324. In some modes or in some implementations, such control signals may be generated in response to inputs received from an operator remote from tractor 324, not residing in cab 418. In some modes or in some implementations, such control signals may be generated in response to inputs received from an operator providing input which is captured by camera unit 422. In some modes or in some implementations, such control signals may be generated in response to inputs from an operator residing within 418. For example, an operator may adjust a throttle which causes controller 416 to change the torque output by torque source 406. An operator may shift a gear which causes controller 416 up control signals adjusting transmission 408. An operator may turn a steering wheel or reposition a joystick causing controller 4162 up control signals to steering actuator 412. As will be described hereafter, such control signals may be based upon a calibration correction for wheel encoder 410 and potentiometer 414 from calibration unit 328.

Cab 418 comprises a compartment in which an operator may be seated when operating tractor 324. Cab 418 comprises a seat 460, a steering wheel 462, a control console 464 and a roof 466. Roof 466 extends over control seat 460 and control console 464. In some implementations, roof 466 may be raised and lowered.

GPS units 420 are supported by roof 466. As schematically illustrated, each of GPS units 420 comprises a GPS antenna 470 and an inertial measurement unit (IMU) 472 housed in a single enclosure or housing 473. In some implementations, each GPS unit 420 is a commercially available GPS unit sold as a single component, having a reduced overall cost as compared to individual GPS antenna and IMUs. Signals from IMUs 472 are transmitted to calibration unit 328.

In the example illustrated, GPS unit 420-1 is located at a front end of roof 466, forward of rear axle 454 while GPS unit 420-2 is located at a rear end of roof 466, rearward of rear axle 454.

Camera units 422-1 and 422-2 are supported by roof 466 at a front and a rear of roof 466, facing in forward and rearward directions, respectively. Camera unit 422-1 is positioned forward of rear axle 454 while camera unit 410-2 is supported rearward of rear axle 454. As schematically illustrated, each of camera units 422 comprises a camera 474 and inertial measurement unit 476. In the example illustrated, each of camera units 422 integrate a camera and inertial measurement as a single integrated component contained within a single housing 477. In some implementations, each of camera units 422 is a commercially available camera unit sold as a single component, having a reduced overall cost as compared to individual cameras and IMUs.

Camera 474 of camera unit 422-1 captures video or images in front of tractor 324. Camera 474 of camera unit 422-2 captures video images towards a rear of tractor 324. In some implementation, camera 474 may comprise a stereo camera. In other implementations, camera 474 may comprise a monocular camera.

Inertial measurement units (IMUs) 476 of camera units output signals which may indicate or may be used to determine the roll and pitch of tractor 324 at the location of the individual IMUs. Signals from IMUs 476 are transmitted to calibration unit 328.

IMUS 440 (schematically illustrated) are supported by roof 466 and provide inertial measurements at additional locations on roof 466. IMUs 440 may be similar to IMUs 40 described above. In the example illustrated, IMUs 440 are embedded within roof 466. Signals from IMUs 440 are transmitted to RAC location acquisition unit 328.

Calibration unit 328 is similar to calibration unit 28 described above except that the instruction contained in non-transitory computer-readable medium 352 direct processing unit 50 to determine and apply calibration corrections to both yaw rate and speed based upon signals received from each of IMUs 472 of GPS units 408-1, 408-2, IMUs 476 of each of camera units 410-1 and 410-2 and both of IMUs 440-1, 440-2.

FIG. 6 is a flow diagram illustrating an example method 500 that may be carried out by calibration unit 328 and tractor 324. In some implementations, the calibration of the yaw rate and speed tractor parameters may be initiated (and repeated in a periodic fashion (i.e., every X seconds) until termination) in response to input from an operator, either an operator riding or driving tractor 324 or a remote operator. In some implementations, the calibration may be initiated according to a predetermined pattern. For example, the calibration may be initiated periodically based on time or periodically based upon distance traversed by the tractor.

In some implementations, the calibration may be automatically triggered in response to certain conditions or certain operations being carried out or to be carried out by tractor 324 or by any attachments/implements moved by tractor 24. In some implementations, the calibration process may be triggered automatically in response to tractor 324 or unit 328 receiving signals from a sensor or commands from an operator or automated program indicating that a particular implement operation is about to begin. For example, in circumstances where the precise positioning of tractor 324 is beneficial, such as the initiation of planting, spraying a chemical or fertilizer, applying a fertilizer, cultivation, performing a pruning operation, harvesting a crop, or the like, the RAC location estimation process may be initiated. The process may be repeated or continued until the circumstances that demand the precise positioning of tractor 324 have expired. In some implementations, the calibration may be initiated and may continue to be carried out in a periodic fashion (i.e., every X seconds) while tractor 324 is being used or operated.

As indicated by blocks 504 and 506, calibration unit 328 may perform a selected one of wheel encoder (speed calibration) and potentiometer (yaw rate) calibration or may perform both of such calibrations. When calibrating the tractor parameter speed, unit 328 determines a calibration correction for wheel encoder 410 by determining a first tractor parameter estimate for speed per block 510 and a second tractor parameter estimate for speed per block 512. The first tractor parameter estimate for speed is a differentiated GPS forward speed. As indicated by blocks 514 and 516, estimates for the location of GPS antenna 470 of GPS unit 420-1 are determined at two different times T1 and T2 using signals received by antenna 470 of GPS unit 420-1. As indicated by blocks 518 and 520, unit 328 obtains multiple acceleration data values from multiple inertial measurement units at time T1 and also at time T2.

In some implementations, calibration unit 328 determines vibrations experienced by the different IMUs, as indicated by signals from the different IMUs. The vibrations are compared against predetermined thresholds. Depending upon the comparison, the different acceleration measurements from different IMUs may be differently weighted when being input into the extended Kalman filter in block 522. For example, it has been found that the reliability of certain IMUs may degrade when vibration levels exceed certain thresholds. By applying lower weightings to those IMUs experiencing higher levels of vibration, enhanced results may be output by the extended Kalman filter.

As indicated by block 522, the IMU measurements taken at time T1 are combined using an extended Kalman filter to determine roll and pitch. As indicated by block 524, the roll and pitch estimates for tractor 324 at time T1 are used, along with the relative physical positioning of the GPS antenna 470 of GPS unit 420-1 with respect to RAC 456, to estimate geographic location of RAC 456 at time T1. In some implementations, calibration unit 328 determines vibrations experienced by the different IMUs, as indicated by signals from the different IMUs. The vibrations are compared against predetermined thresholds. Depending upon the comparison, the different acceleration measurements from different IMUs may be differently weighted when being input into the extended Kalman filter in block 526. For example, it has been found that the reliability of certain IMUs made a grade when vibration levels exceed certain thresholds. By applying different weights to the different measurements from the different IMUs, enhanced results may be output by the extended Kalman filter.

As indicated by block 526, the IMU measurements taken at time T2 are combined using an extended Kalman filter to determine roll and pitch. As indicated by block 528, the roll and pitch estimates for tractor 324 at time T2 are used, along with the relative physical positioning of the GPS antenna 470 of GPS unit 420-1 with respect to RAC 456, to estimate geographic location of RAC 456 at time T2. In some implementations, other GPS antenna may be used to determine or estimate the geographic locations of RAC 456.

As indicated by block 530, the two RAC location estimates determined in blocks 524 and 528 are compared. The distance between the two RAC location estimates may be divided by the lapse of time between times T1 and T2 to determine an RAC speed estimate. This speed estimate is fed into an extended Kalman filter as indicated by block 532.

As indicated by block 512, a speed estimate for the time between times T1 and T2 is also determined by unit 328 using or based upon signals from wheel encoder 410. This fiesta may be the average speed indicated by signals from wheel encoder 410 during this period of time. This speed estimate is further input into the extended Kalman filter as indicated by block 532.

As indicated by block 534, unit 328 compares the output of the extended Kalman filter speed estimate determined in block 532 with the wheel encoder forward speed determined in block 512 to identify any differences between the two speed estimates. This distance is used as a basis for determining a calibration correction for the wheel encoder 410. In some implementations, calibration correction is the difference between the wheel encoder forward speed determined in block 512 and the wheel encoder speed estimate determined in block 532.

As indicated by block 536, the determined speed calibration correction is then applied to the wheel encoder forward speed determined in block 512. The determined speed calibration correction may be an offset that is applied to any output provided by wheel encoder 410. The determined speed calibration correction may further be transmitted to drive/steering controller 416, wherein the control signals generated and output by controller 416 for controlling torque source 406 and/or transmission 408 are adjusted based upon the determined speed calibration correction. As indicated by block 538, drive/steering controller 416 may use the adjusted or newly calibrated settings for the wheel encoder 418 to control the speed of tractor 324.

As indicated by block 506, when calibrating the tractor parameter yaw rate, unit 328 determines a calibration correction for potentiometer 414 by determining an IMU rotation velocity yaw rate estimate per block 550, a multiple GPS yaw rate estimate per block 552 and a potentiometer-based yaw rate estimate per block 554. The IMU rotation velocity yaw rate estimate is determined by unit 328 based upon signals received from at least one IMU of tractor 324. In one implementation, the IMU rotation velocity yaw rate estimate is based upon a combination of IMU estimates from each of the IMUs 472 of GPS units 420-1, 420-2, each of the IMUs 476 of camera units 422-1 and 422-2 and each of the IMUs 424. In some implementations, the IMU estimates from each of the IMUs are combined using a Kalman filter, such as an extended Kalman filter. The IMU rotation velocity yaw rate estimate output from the extended Kalman filter is input into the extended Kalman filter as indicated by block 556.

In some implementations, calibration unit 328 determines vibrations experienced by the different IMUs, as indicated by signals from the different IMUs. The vibrations are compared against predetermined thresholds. Depending upon the comparison, the different rotational velocity yaw rate estimates from different IMUs maybe differently weighted when being input into the extended Kalman filter. For example, it has been found that the reliability of certain IMUs may degrade when vibration levels exceed certain thresholds. By applying different weights to the different measurements from the different IMUs, enhanced results may be output by the extended Kalman filter. For example, a lower weight may be applied to measurements from those IMUs experiencing levels of vibration that exceed a predetermined threshold.

The multiple GPS yaw rate estimate determined by unit 328 in block 552 is based upon multiple GPS antenna location estimates from multiple space GPS units, wherein a line is drawn between the units (located foreign after one another, provided direct measurement of the yaw rate of tractor 324. In the example illustrated, a line may be drawn between the determined geographic locations of antennas 470 of GPS units 420-1 and 420-2, wherein the geographic locations of the endpoints of the line may be used to determine the yaw rate of tractor 324. The multiple GPS yaw rate estimate is input into the extended Kalman filter as indicated by block 556.

As indicated by block 554, unit 328 determines a potentiometer-based yaw rate estimate. This estimate is based upon a combination of a potentiometer sensed steering angle per block 558, the front axle to rear axle distance, and a forward speed of tractor 324. The potentiometer sensed steering angle determined in block 558 is based upon signals received from potentiometer 414.

The forward speed which is used in combination with the potentiometer sensed steering angle to determine the potentiometer-based yaw rate estimate may be obtained by unit 328 from two sources: wheel encoder forward speed as indicated by block 562 and/or differentiated GPS forward speed as indicated by block 564. The wheel encoder forward speed determined in block 562 is based upon the forward speed of tractor 324 based upon signals from wheel encoder 410. This value may be the same value determined in block 512 for the given time period. The potentiometer-based yaw rate estimate that is based upon the potentiometer sensed steering angle and the wheel encoder forward speed is then input into the extended common filter as indicated by block 556.

The differentiated GPS forward speed 564 is an estimate of the forward speed based upon signals received by a GPS antenna at two different times, times corresponding to the times during which the other yaw rate estimates in blocks 550, 552 were determined. The differentiated GPS forward speed determined in block 564 may be determined in a similar fashion as the determination of the RAC speed estimate described with respect to blocks 514-530. This differentia GPS forward speed and the potentiometer sensed steering angle are used to determine a potentiometer-based yaw rate estimate which is then input into the extended Kalman filter as indicated in block 556.

In the example illustrated, four different yaw rate estimates are input into the extended common filter in block 556: (1) the IMU rotation velocity yaw rate estimate determined in block 550; (2) the multiple GPS yaw rate estimate determined in block 552; (3) the potentiometer-based yaw rate estimate using differential GPS forward speed; and (4) the potentiometer-based yaw rate estimate determined using wheel encoder forward speed. In other implementations, a greater or fewer of such yaw rate estimates may be input into the extended common filter block 556. For example, in some implementations, a single potentiometer-based yaw rate estimate using either the wheel encoder forward speed or the differentiated GPS forward speed with the potentiometer sensed steering angle may be input into the extended Kalman filter per block 556. In some implementations, the determination of the multiple GPS yaw rate estimate in block 552 may be omitted. In some implementations, the determination of the IMU rotation velocity yaw rate estimate in block 550 may be omitted.

As indicated by block 574, unit 328 compares the output of the extended Kalman filter yaw rate estimate determined in block 556 with the potentiometer-based yaw rate estimate determined based upon either the wheel encoder forward speed or the differentiated GPS forward speed to identify any differences between the two speed estimates. This distance is used as a basis for determining a calibration correction for the potentiometer 414. In some implementations, calibration correction is the difference between the yaw rate estimate determined in block 556 and the potentiometer-based estimate determined in either blocks 54, 558, 564 or block 554, 558 and 562. In some implementations, the two different potentiometer based yaw rate estimates determined using wheel encoder forward speed and differentiated GPS forward speed may be combined as inputs into a Kalman filter such as an extended common filter, wherein this result is input into the extended common filter yaw rate estimate per block 556 and/or is compared to the output of the extended common filter yaw rate estimate determined in block 556 which additionally includes the multiple GPS yaw rate estimate determine block 552 and/or the I am you rotation velocity yaw rate estimate determine block 550.

As indicated by block 576, the determined yaw rate calibration correction is then applied to the potentiometer sensed steering angle determined in block 558. The determined yaw rate calibration correction may be an offset that is applied to any output provided by potentiometer 414. The determined yaw rate calibration correction may further be transmitted to drive/steering controller 416, wherein the control signals generated and output by controller 416 for controlling steering sugar 412, torque source 406 and/or transmission 408 are adjusted based upon the determined yaw rate calibration correction. As indicated by block 578, drive/steering controller 416 may use the adjusted or newly calibrated settings for the potentiometer 414 to control the steering angle and resulting yaw rate of tractor 324.

Figure 7:
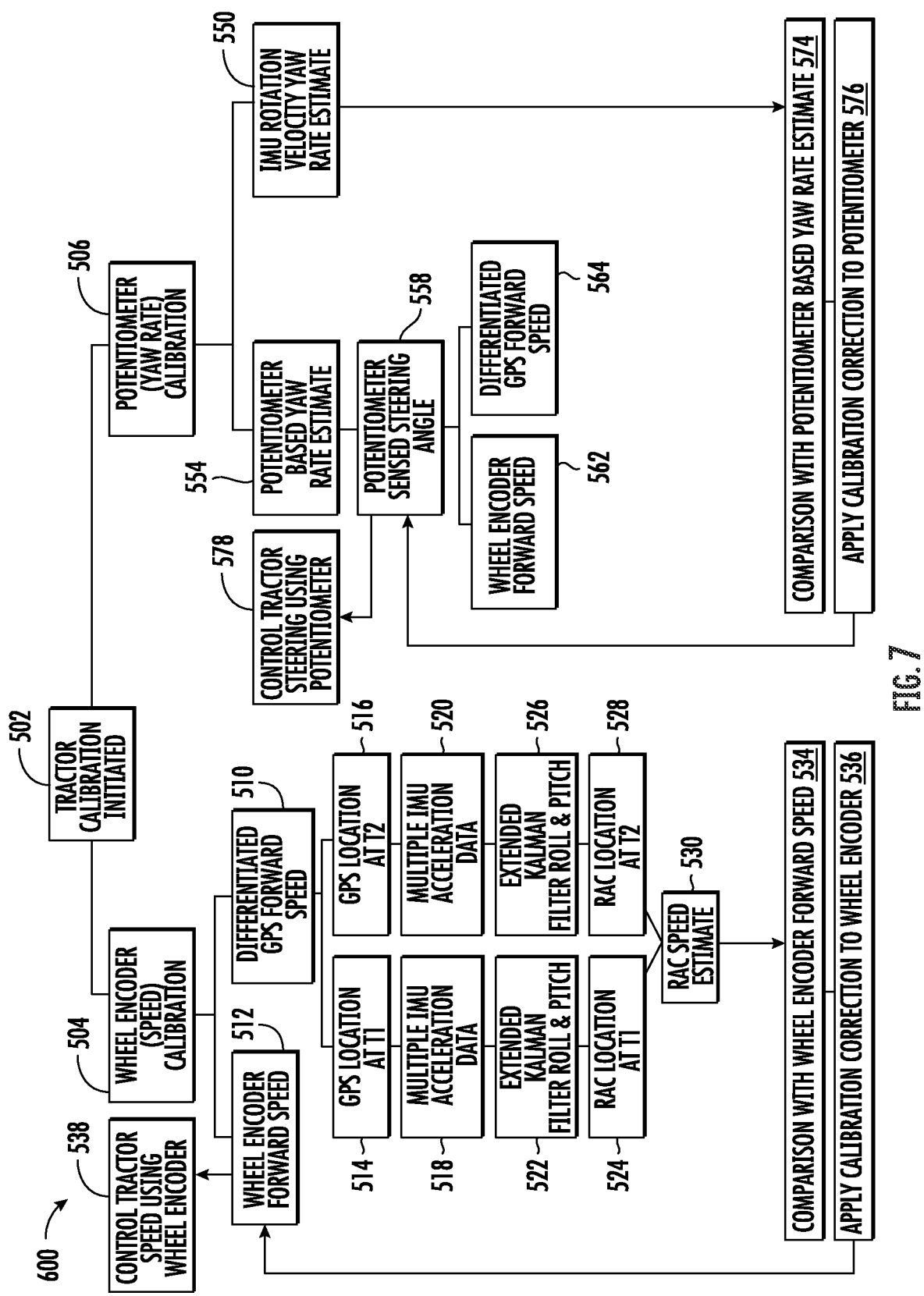
FIG. 7 is a flow diagram of an example tractor parameter calibration method.

FIG. 7 is a flow diagram of an example method 600 then be carried out by calibration unit 328 of tractor 324. Method 600 is similar to method 500 described above except that method 600 omits blocks 534 and 574 such that method 600 is not combine estimates from the wheel encoder with other speed estimates in a Kalman filter to determine a calibration correction for the wheel encoder and such that method 600 does not combine estimates based upon measurements from the potentiometer with other yaw rate estimates in a Kalman filter to determine a calibration correction for the potentiometer. In method 600, the wheel encoder forward speed estimated in block 512 is directly compared against the RAC speed estimate in block 530 to determine the wheel encoder (speed) calibration which is then applied in block 536 to the wheel encoder forward speed determined in block 512. In method 600, the potentiometer based yaw rate estimate based upon either the potentiometer sensed steering angle and the wheel encoder forward speed or the potentiometer sensed steering angle and the different GPS forward speed is directly compared against either the multiple GPS yaw rate estimate determined in block 552 or the IMU rotation velocity yaw rate estimate determined in block 5502 determine the potentiometer (yaw rate) calibration which is then applied to the potentiometer sensed steering angle in block 558. Those blocks of method 600 which correspond to blocks of method 500 are numbered similarly.

Figure 8:
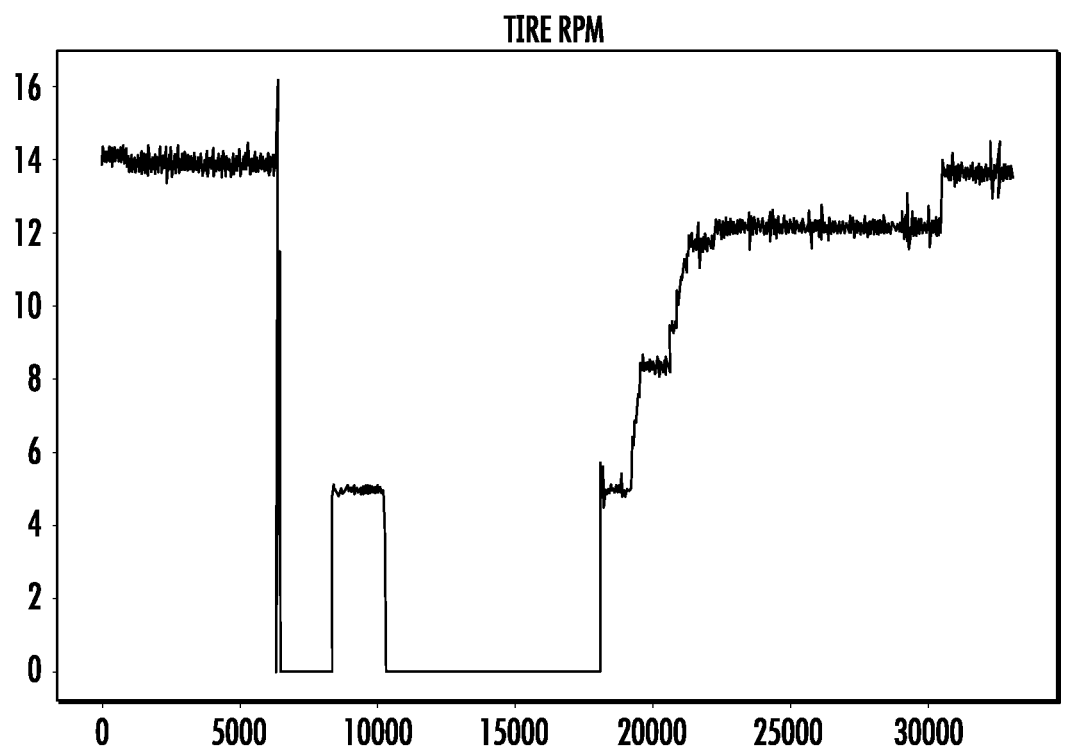
FIG. 8 is a diagram plotting speed estimates over time based upon signals from a wheel encoder.
Figure 9:
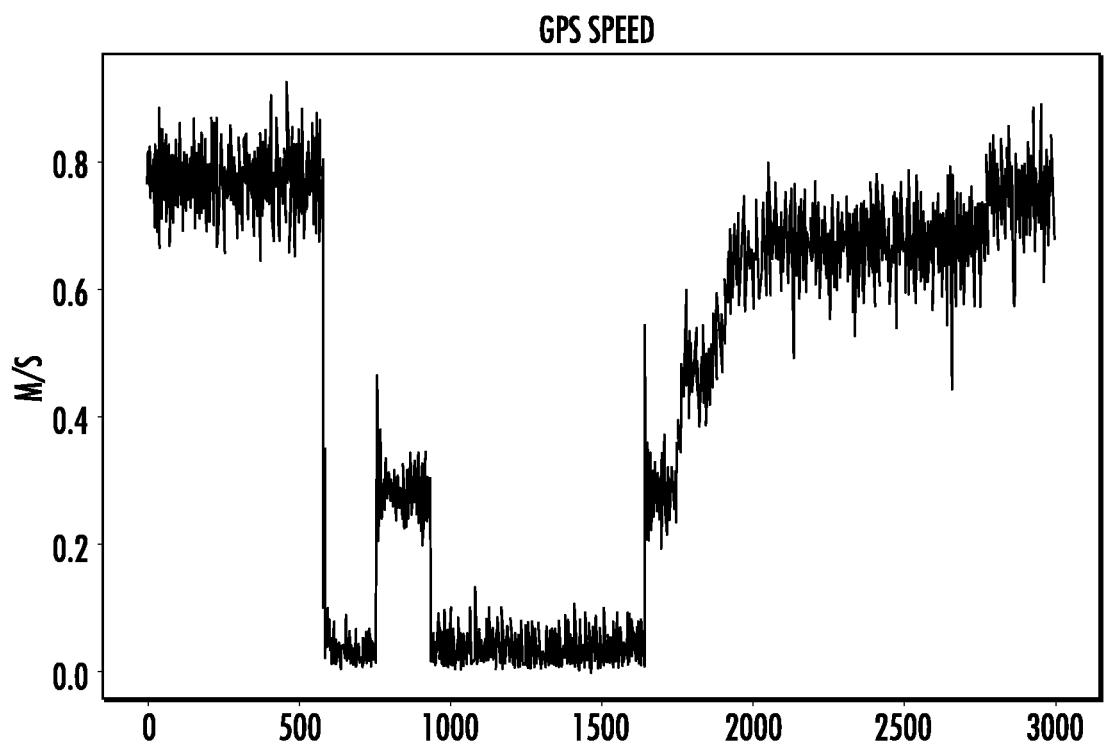
FIG. 9 is a diagram plotting speed estimates over the time of FIG. 8 based upon signals from a GPS antenna.

FIGS. 8 and 9 illustrate an example of how signals from a wheel encoder may be used to determine a wheel rotation data calibration correction. In the example illustrated, wheel encoders report left and right wheel rotations per minute (RPM). The left and right RPM values are averaged into a single bicycle-model tire speed as shown in FIG. 8. Under nonslip conditions, the tractors forward linear speed is a product of the tires rotation rate (in radians per second) and the tire radius (in meters).

FIG. 9 illustrates an example of a reported speed of the tractor 24 as indicated from signals received by the GPS antenna 470 of unit 420-1. Processing unit 50, following instruction contained in medium 352, may solve for a tire radius that minimizes any error between the GPS determine speed in FIG. 8 and the calculated wheel odometry speed based upon wheel RPM and radius. The determined updated tire radius serves as a wheel rotation data calibration correction, wherein subsequent determinations of the tractor geographic location may be determined by calibration unit 328 using a prior determined tractor geographic location (whether determined (a) from GPS signals or (b) from yet a prior tractor geographic location, wheel rotation data and steering data), steering data and wheel rotation data, wherein the wheel rotation data is based upon sensed wheel RPM from an encoder and the corrected or updated tire radius.

Figure 10:
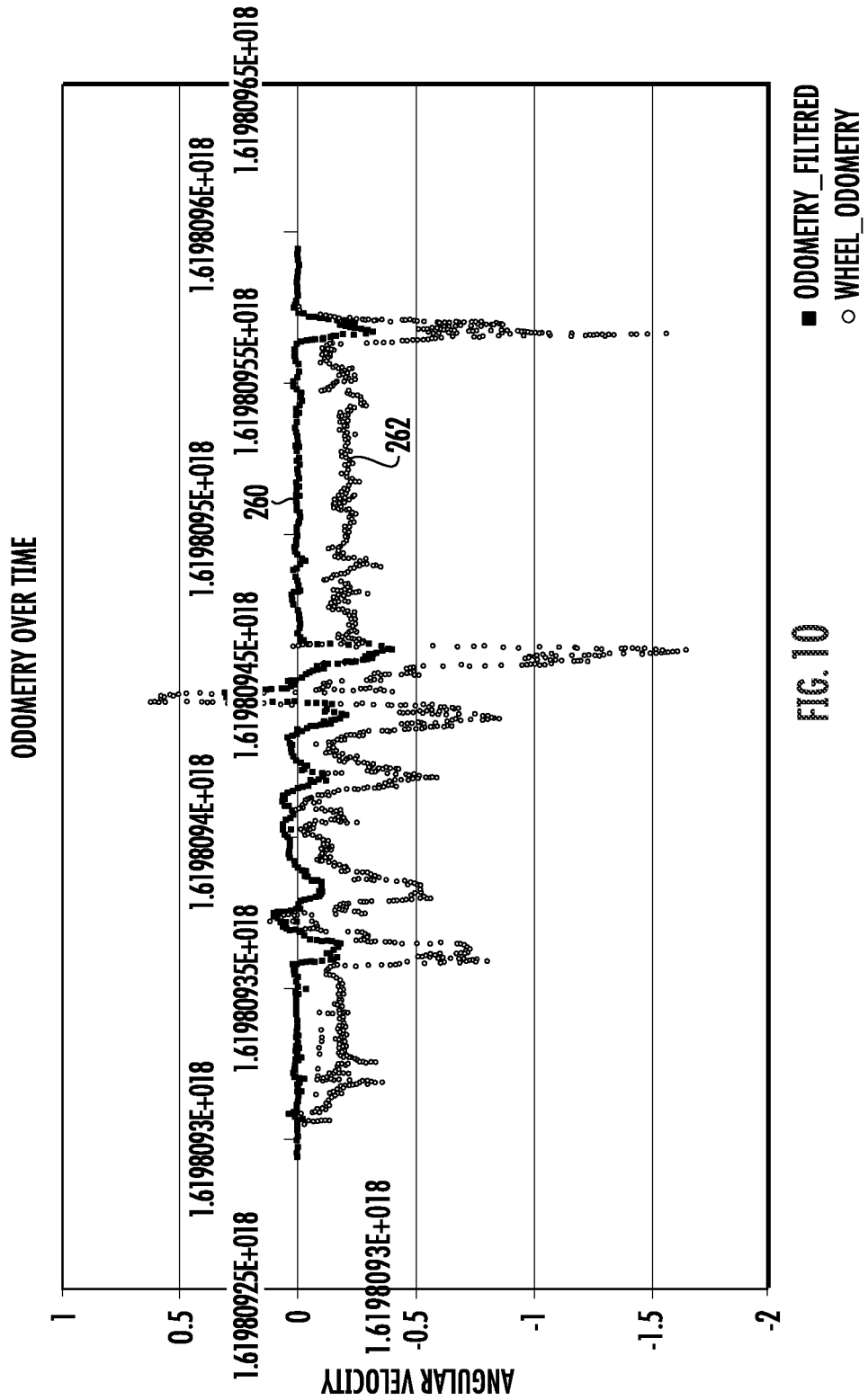
FIG. 10 is a diagram plotting a first yaw rate estimate based upon signals from an inertial measurement unit plotting a second yaw rate estimate based upon signals from a potentiometer.

As shown by FIG. 10, in a similar fashion, signals from an encoder/potentiometer indicating steering angle may calibrated. For example, in some implementations, the steering offset or steering data calibration correction may be determined by comparing the turning of tractor 24 indicated by the potentiometer to the turning of tractor 24 (tractor or vehicle rotation) reported from onboard tractor sensors such as inertial measurement units. Such inertial measurement units may report rotational or turning velocity/yaw rate. Processing unit 50, following instructions contained in medium 352, may transform the velocity output by the inertial measurement unit or units of tractor 324 to the frame or base link (the point of origin defining the location) of tractor 24, resulting in data plot 260.

This plot may be compared to a plot 262 of the steering angle as indicated by the wheel encoders. The reported steering angle and forward velocity may be used to calculate a rotation rate for the vehicle as follows:

$$\omega = \frac{\text{velocity}}{L}\tan(\delta)$$

δ=reported steering angle
L=distance between the rear and the front axle (wheelbase).
This calculated tractor rotation rate is plot 262 in the FIG. 10.

Based upon a comparison of plots 260 and 262, processing unit 50 may compute the steering offset by solving for a bias that minimizes the difference between plots 260 and 262.

Although the disclosure has been described with reference to example implementations, workers skilled in the art will recognize that changes may be made in form and detail without departing from the scope of the claimed subject matter. For example, although different example implementations may have been described as including features providing benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements. The terms "first", "second", "third" and so on in the claims merely distinguish different elements and, unless otherwise stated, are not to be specifically associated with a particular order or particular numbering of elements in the disclosure.

What is claimed is:

1. A tractor calibration system comprising:
   a first sensor;
   a tractor comprising a second sensor;
   a calibration unit comprising:
      a processing unit; and
      a non-transitory computer-readable medium containing instructions to direct the processing unit to:
         determine a first estimate for a tractor parameter based upon signals received from the first sensor;
         determine a second estimate for the tractor parameter based upon signals received from the second sensor;
         determine a third estimate for the tractor parameter based upon a combination of the first estimate and the second estimate;
         determine a tractor parameter correction based upon the second estimate and the third estimate; and
   a controller configured to output control signals to adjust at least one of a steering and propulsion of the vehicle based on the tractor parameter correction,
   wherein the tractor parameter comprises a yaw rate of the tractor, wherein the second sensor comprises a potentiometer on the tractor and wherein the tractor parameter correction is to be applied to steering angle measurements by the potentiometer,
   wherein the first sensor comprises a first global positioning system (GPS) antenna, wherein the tractor comprises a second GPS antenna rearward of the first GPS antenna on the tractor, wherein the first estimate is based upon a combination of positions indicated by signals received by the first GPS antenna and second signals received by the second GPS antenna and
   wherein the tractor further comprises an inertial measurement unit, wherein the second estimate is based upon a steering angle indicated by the potentiometer and a forward speed, and wherein the third estimate is based upon a combination of the first estimate, the second estimate and a fourth estimate of the tractor parameter based upon signals from the inertial measurement unit.

2. The tractor calibration system of claim 1, wherein the processing unit is to use a Kalman filter to combine the first estimate, the second estimate and the fourth estimate.

3. The tractor calibration system of claim 1, wherein the tractor comprises wheel encoders and wherein the instructions are to direct the processing unit to determine the forward speed based upon signals from the wheel encoders.

4. The tractor calibration system of claim 1, wherein the tractor comprises a global positioning system (GPS) antenna and wherein the instructions are to direct the processing unit to determine the forward speed based upon signals received by the GPS antenna.

5. The tractor calibration system of claim 4, wherein the tractor further comprises an inertial measurement unit, wherein the forward speed is additionally based upon roll and pitch estimations based upon signals from the inertial measurement unit.

6. The tractor calibration system of claim 5, wherein the tractor comprises a second inertial measurement unit, wherein the roll and pitch estimations are based upon a fusion of signals from the inertial measurement unit and the second inertial measurement unit.

7. The tractor calibration system of claim 6, wherein the processing unit is to use a Kalman filter to fuse the signals from the inertial measurement unit and the second inertial measurement unit to determine the roll and pitch estimations.

8. The tractor calibration system of claim 7, wherein the processing unit is to use a second Kalman filter to combine the first estimate and the second estimate to determine the third estimate.

9. The tractor calibration system of claim 5, wherein the instructions are to direct the processing unit to determine a vibration amount proximate the inertial measurement unit and to apply weight to signals from the inertial measurement unit based upon the determined vibration amount.

10. The tractor calibration system of claim 9, wherein the first sensor positioning system (GPS) antenna and wherein the instructions are to direct the processing unit to determine a roll and pitch of the tractor based upon combined data from the inertial measurement units and to determine the estimate based upon the signals received by the GPS antenna and the determined roll and pitch.

* * * * *